UNITED STATES PATENT OFFICE.

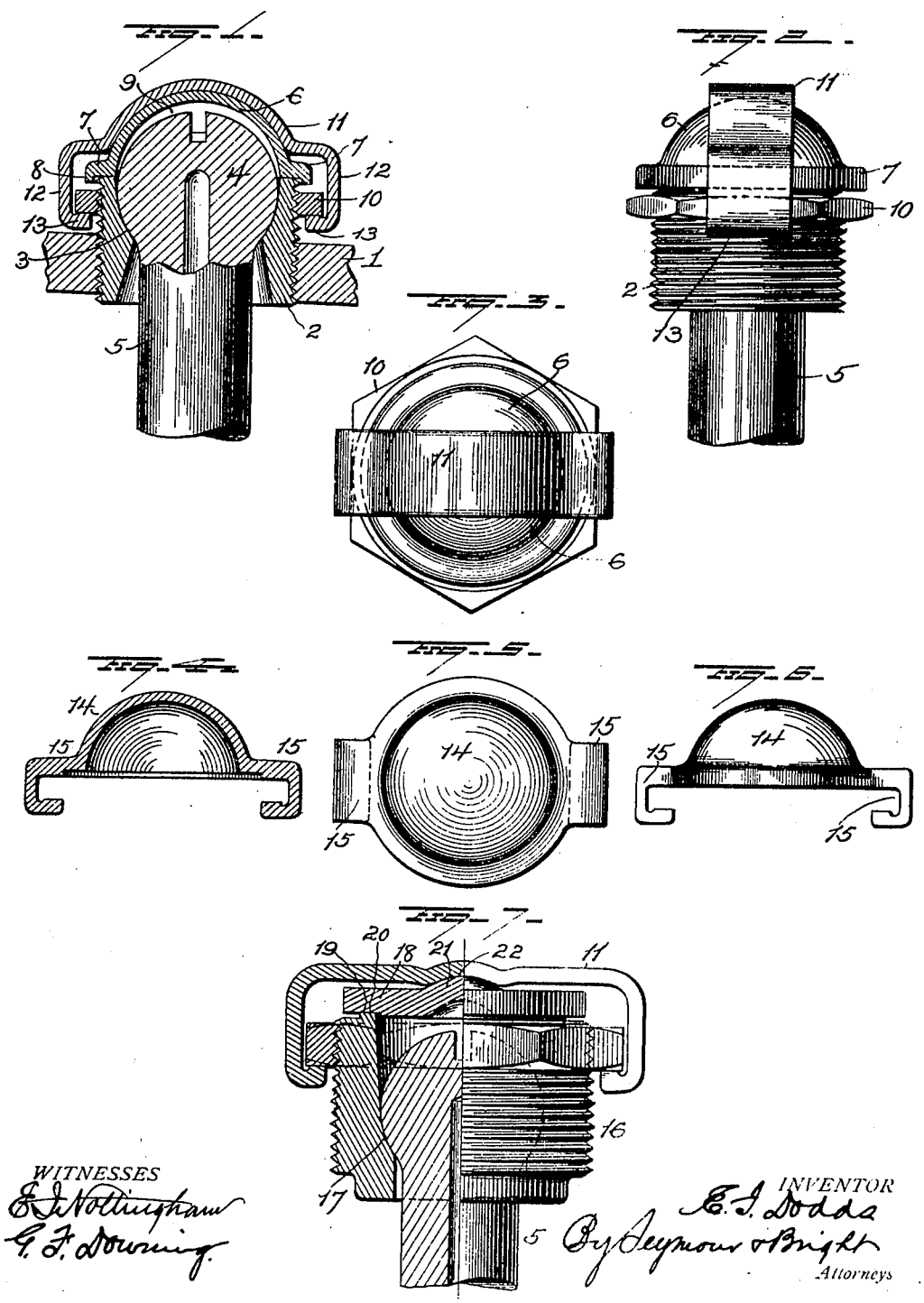

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,298,306.   Specification of Letters Patent.   Patented Mar. 25, 1919.

Application filed April 26, 1918. Serial No. 230,895.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures, and more particularly to the bearing and cap portions thereof,—the object of the invention being to provide simple and efficient means whereby the cap portion of a flexible stay bolt structure may be quickly removed to expose the head of the bolt and facilitate testing of the latter and which may be quickly replaced and tightly secured in normal position.

With this and other objects in view, the invention consists in certain novel features of construction and combinations of parts as hereinafter set forth and pointed out in the claims.

In the accompanying drawings, Figure 1 is a sectional view showing the application of my improvement; Fig. 2 is a view in elevation of the same; Fig. 3 is a plan view, and Figs. 4, 5, 6 and 7 are views illustrating modifications.

1 represents a portion of a boiler sheet and 2 a bearing sleeve threaded therethrough. In Fig. 1 of the drawing I have shown a bearing sleeve of that type in which the curved bearing 3 for the rounded or spherical head 4 of a flexible staybolt 5, is located in the upper portion of said sleeve, so that the spherical head of the bolt will project above the sleeve. The closure for the upper end of the sleeve and for the head of the bolt may consist of a partly spherical cap 6 having an annular flange 7 at its edge seated on the outer end of the sleeve, and said flange may be made with a lip or downward projection 8 to overhang the end of the sleeve. The curvature of the cap 6 is such that a space 9 will be left between its inner face and the end of the bolt head to accommodate play of the bolt.

Before the cap 6 is placed in position, an interiorly threaded ring or nut 10 is screwed onto the exteriorly threaded bearing sleeve 2 and this ring or nut may be made hexagonal or other shape to receive a wrench.

A convex clamping member or yoke 11, preferably of spring metal is disposed transversely over the cap 6 and is seated thereon,—the ends of said clamp being made with ears 12 having inwardly projecting lips 13 to engage under the ring or nut 10, clearly shown in Fig. 2.

When the parts shall have been assembled as shown in Figs. 1 and 2 and the ring or nut 10 is turned so as to move toward the boiler sheet, the clamp will be tightened and the cap will thus be firmly clamped to its seat at the outer end of the bearing sleeve. By turning the threaded ring or nut 6 in the reverse direction, the clamp will be loosened and the quick removal of the clamp and cap will be permitted, thus exposing the head of the bolt for testing purposes. It is apparent that the cap and clamp may be as quickly replaced and tightened.

Instead of making the cap and head in separate and separable parts, they may be made in one integral structure as shown at 14 and 15, Figs. 4, 5 and 6.

In the form of the invention shown in Fig. 7, a bearing sleeve 16 of that type in which the curved bearing 17 for the head of the bolt is located near the inner end of the sleeve, and the cap is made in the form of a plate 18 which may be recessed in its inner face to form a seat 19 to rest against an annular rib 20 on the outer end of the bearing sleeve. The plate or cap 18 closes the end of the bearing sleeve slightly beyond the head of the bolt and it may be provided with a central knob or projection 21 to enter a recess 22 at the center of the spring clamp 11. In other respects, the construction shown in Fig. 7 may be the same shown in Figs. 1 and 2.

Other slight changes might be made in the details of construction of my invention without departing from the spirit thereof or limiting its scope, but I consider myself at liberty to make such changes as may fall within the scope and intent of the claims.

Having fully described my invention what I claim as new and desire to secure by Letters-Patent, is:—

1. In a staybolt structure, the combination with a bearing member, and a removable cap, of a clamping device freely embracing the bearing member and engaging the cap, and a ring adjustable on the bearing member and engaged by said clamping device.

2. In a staybolt structure, the combination with a threaded bearing member, of a cap constituting a removable closure for said member, clamping means embracing said cap, and a ring adjustable on said member and engaged by said clamping means exteriorly of the bearing member to tighten and to loosen the clamp and cap and permit the removal of the same.

3. In a staybolt structure, the combination with a threaded bearing member, and a removable cap to seat thereon, of a clamping device for said cap having lips, and a ring adjustable on said bearing member and disposed to receive the lips of the clamping device.

4. In a staybolt structure, the combination with an exteriorly threaded bearing sleeve, of a cap constituting a removable closure therefor, a clamping yoke engaging said cap and having lips at its end, and a nut threaded on said sleeve and engaging said lips.

5. In a staybolt structure, the combination with an exteriorly threaded bearing sleeve, of a cap seated on the outer end of the sleeve and constituting a removable closure therefor, a spring clamping yoke engaging said cap and having inwardly projecting lips at its ends, and a nut on said sleeve to engage the outer faces of said lips.

In testimony whereof, I have signed this specification in the presence of two subscribing witnesses.

ETHAN I. DODDS.

Witnesses:
   G. E. NOTTINGHAM,
   R. S. FERGUSON.